(No Model.) 5 Sheets—Sheet 1.
E. T. GREENFIELD.
UNDERGROUND CONDUIT FOR ELECTRIC WIRES.
No. 441,840. Patented Dec. 2, 1890.
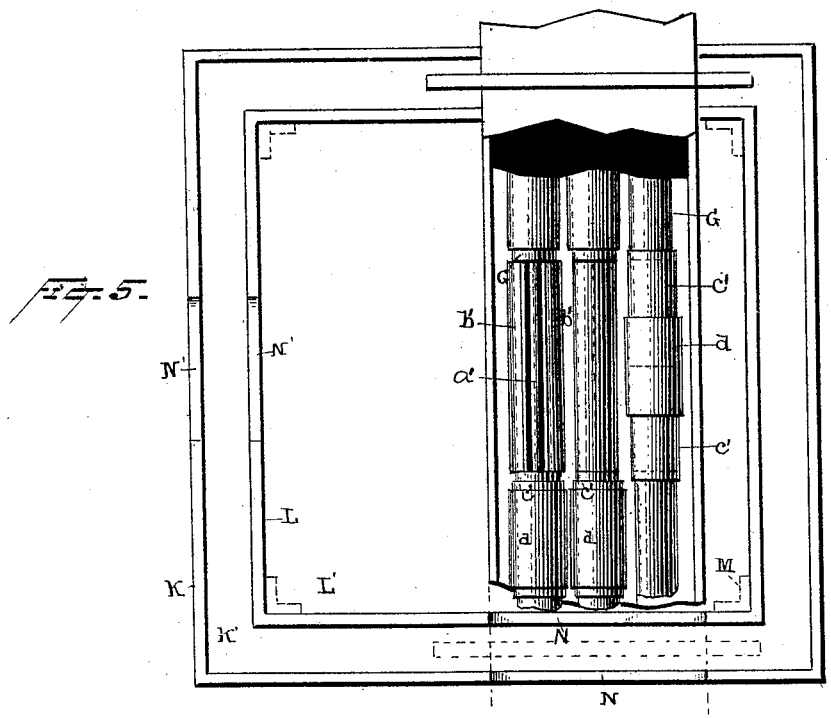
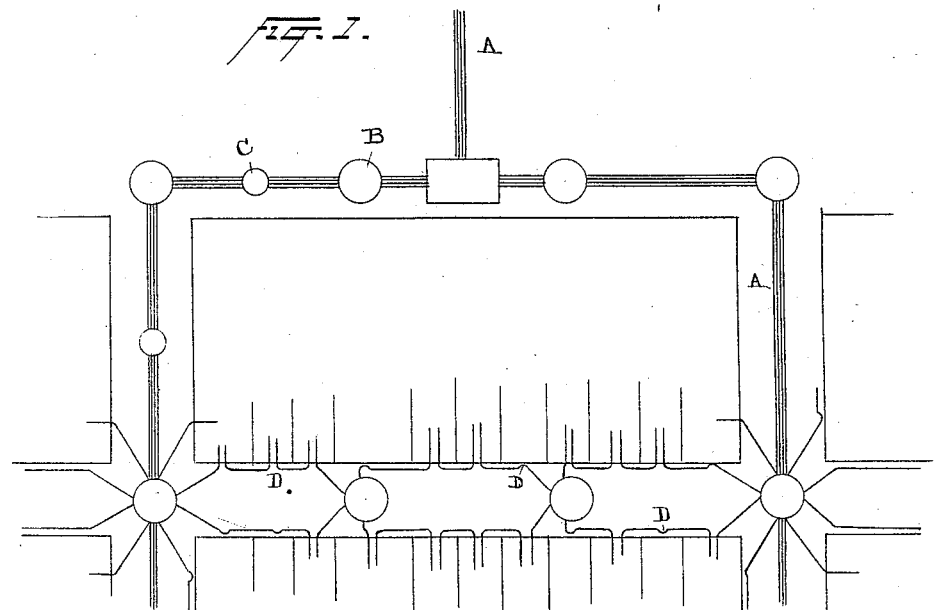
Witnesses
Norris A. Clark
Inventor
Edwin T. Greenfield
By his Attorneys (No Model.)
5 Sheets—Sheet 2.
E. T. GREENFIELD.
UNDERGROUND CONDUIT FOR ELECTRIC WIRES.
No. 441,840.
Patented Dec. 2, 1890.
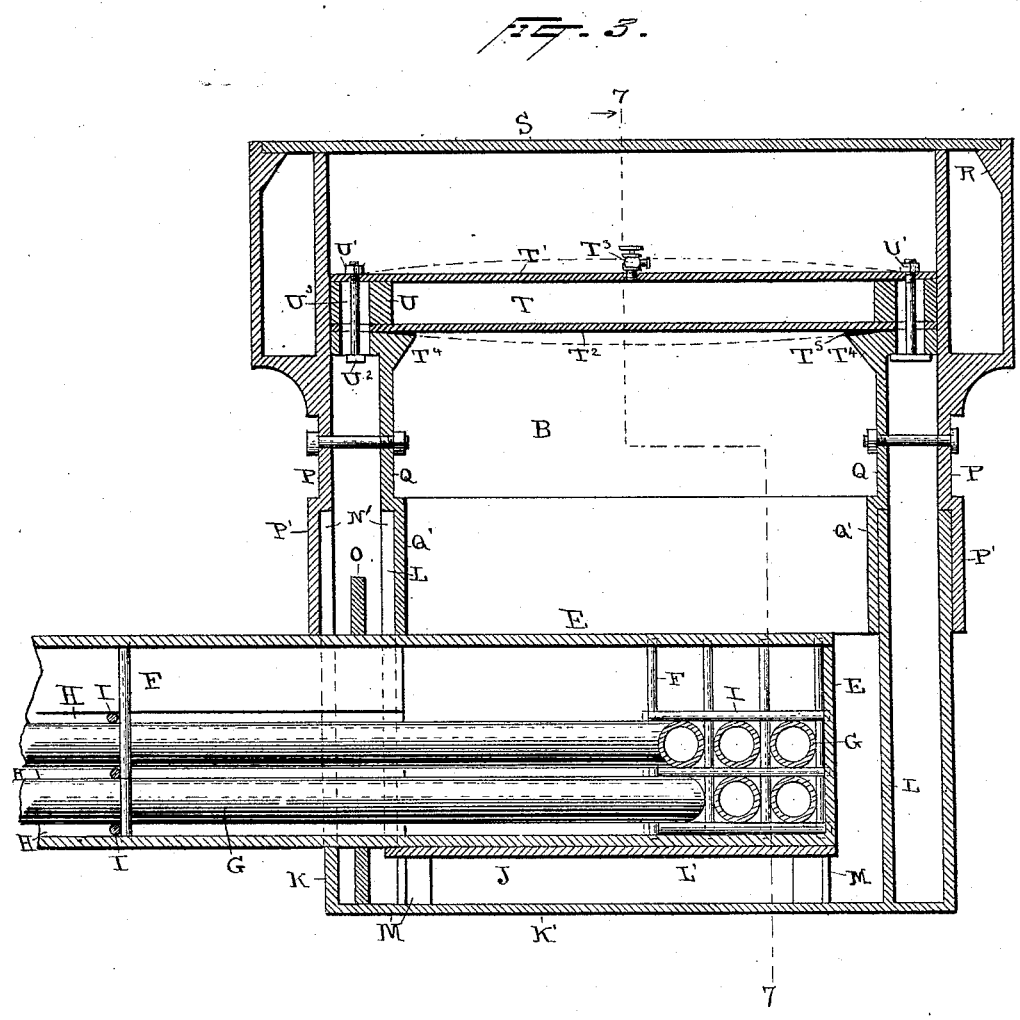
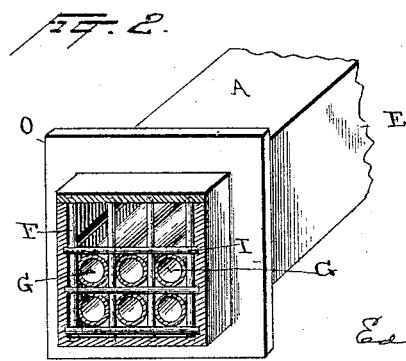

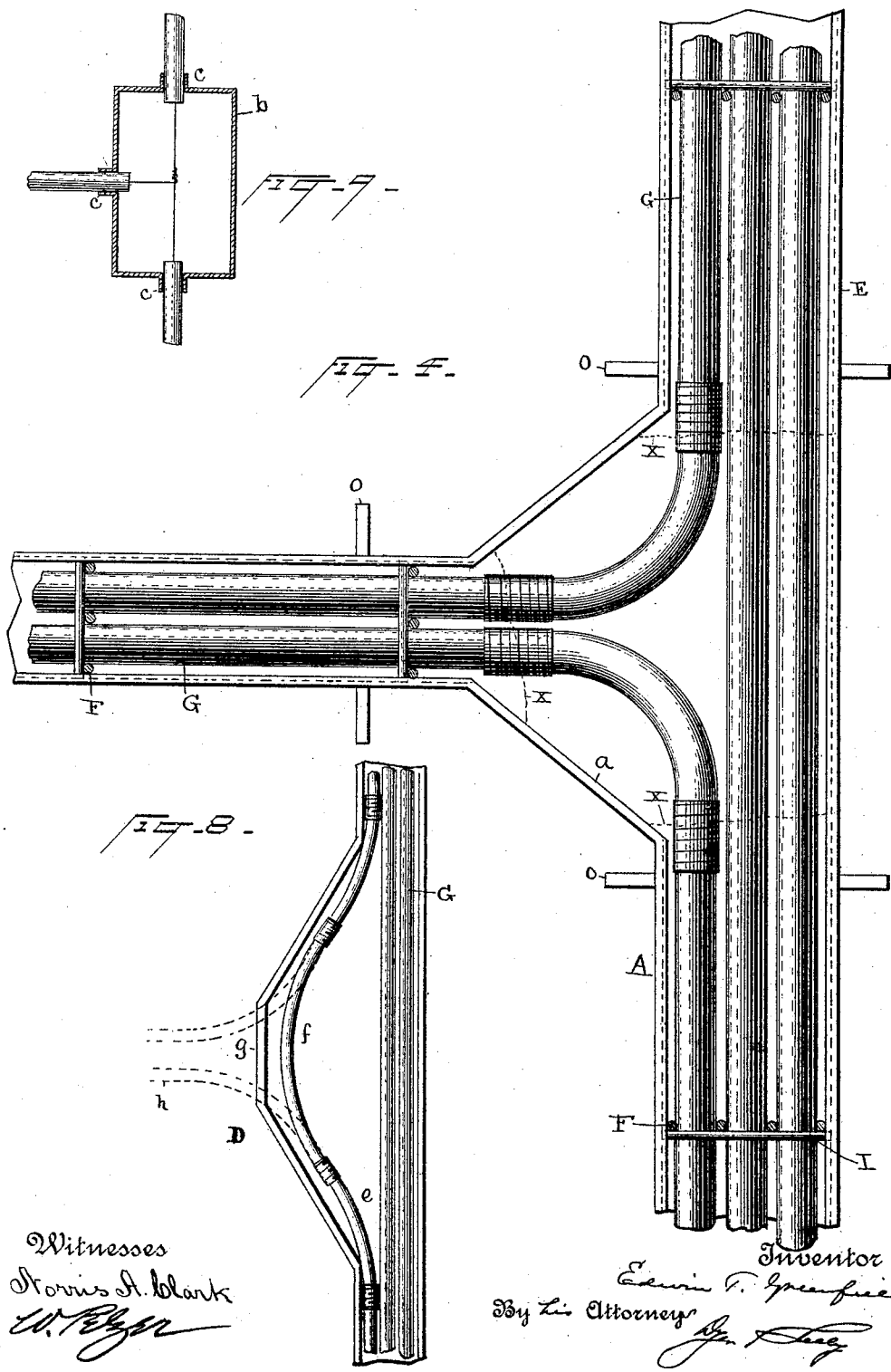

(No Model.)  5 Sheets—Sheet 4.
E. T. GREENFIELD.
UNDERGROUND CONDUIT FOR ELECTRIC WIRES.
No. 441,840.  Patented Dec. 2, 1890.
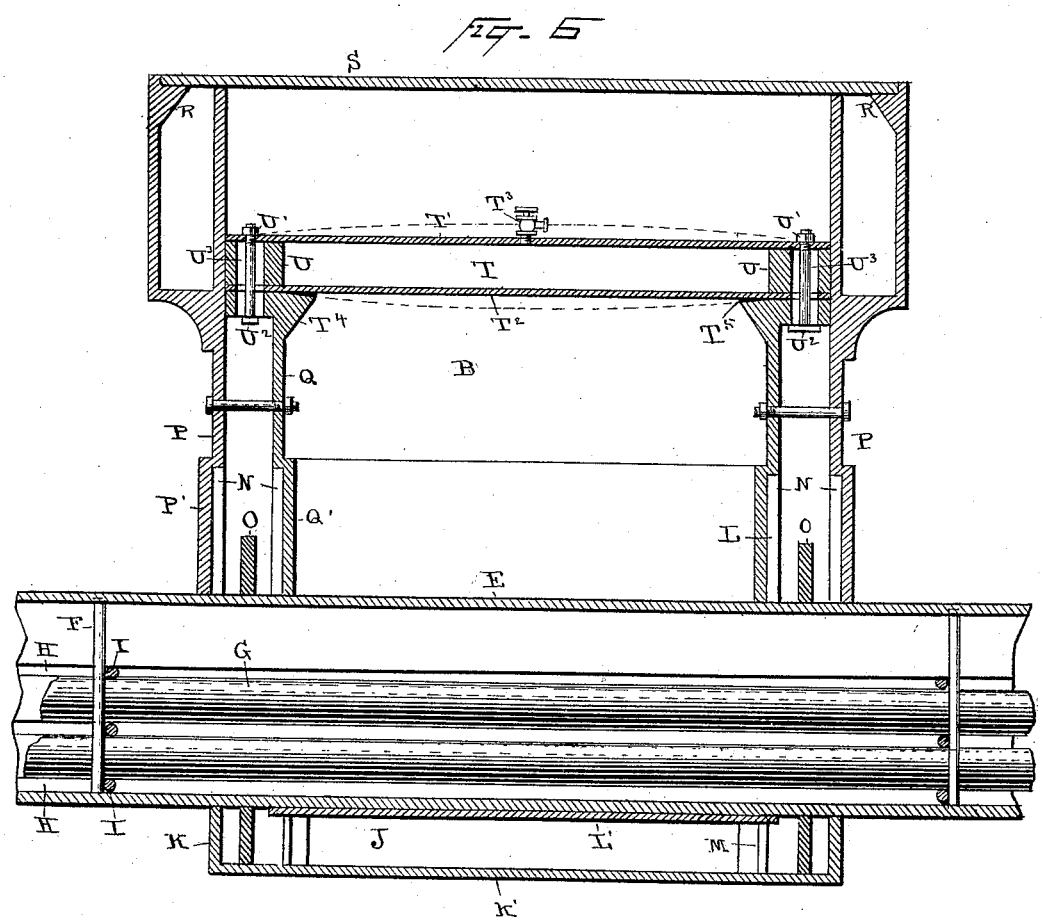

(No Model.) 5 Sheets—Sheet 5.
E. T. GREENFIELD.
UNDERGROUND CONDUIT FOR ELECTRIC WIRES.
No. 441,840. Patented Dec. 2, 1890.
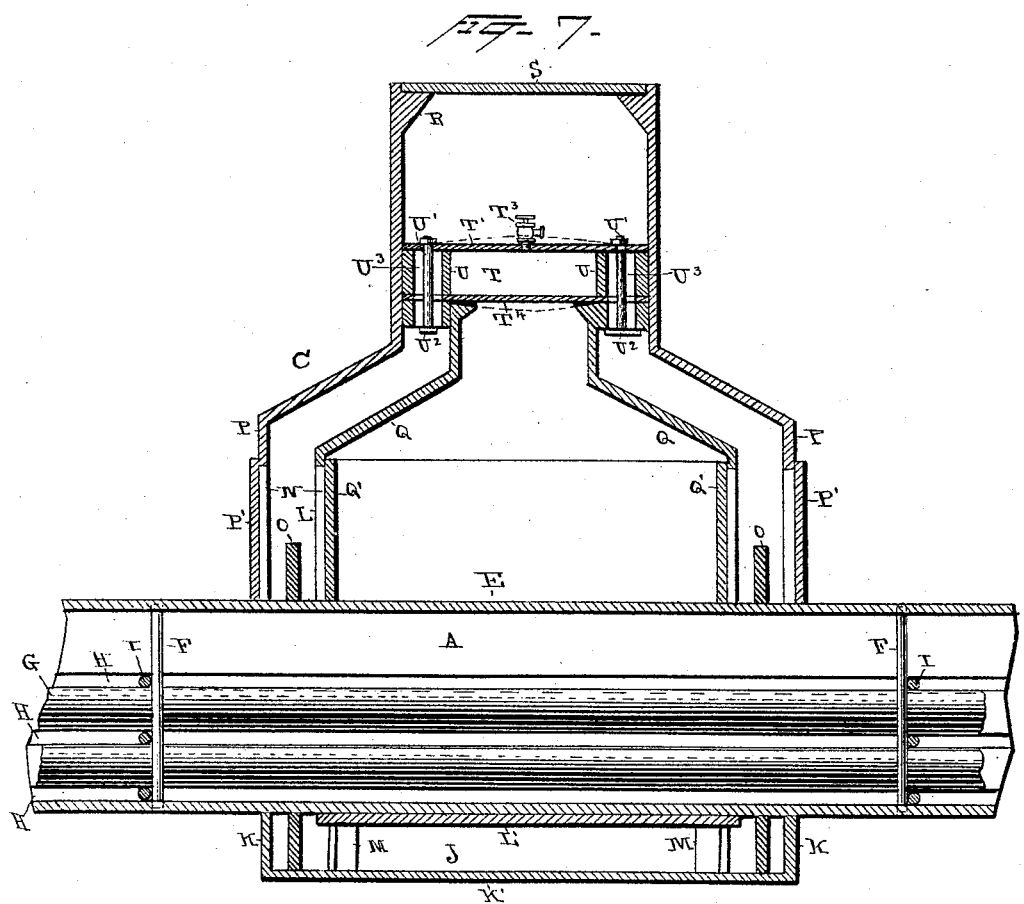

UNITED STATES PATENT OFFICE.

EDWIN T. GREENFIELD, OF NEW YORK, N. Y., ASSIGNOR, BY MESNE ASSIGNMENTS, TO THE INTERIOR CONDUIT AND INSULATION COMPANY.

UNDERGROUND CONDUIT FOR ELECTRIC WIRES.

SPECIFICATION forming part of Letters Patent No. 441,840, dated December 2, 1890.

Application filed May 27, 1890. Serial No. 353,318. (No model.)

*To all whom it may concern:*

Be it known that I, EDWIN T. GREENFIELD, a citizen of the United States, residing at New York city, in the county and State of New York, have invented a new and useful Improvement in Underground Conduits for Electrical Distribution, of which the following is a specification.

My underground conduit system embodies a casing or conduit for electric conductors and man-holes located at suitable distances apart for the purpose of obtaining access to, laying, and connecting the conductors, hand-holes interspersed in the length of the conduit for the purpose of aiding or assisting the laying of the wire, and junction-boxes such that leads may be connected with the mains without disturbing the main casing or conduit.

The object of my invention is a conduit system which shall be easily and cheaply laid, which shall be durable, dry, free from danger of explosion from gases, easily accessible at desired points, and affording high insulation to the naked electrical conductors which I propose to use.

The casing for the electrical conductors, which will hereinafter be termed a "conduit," is laid in sections, and each section comprises a trough, preferably rectangular in cross-section, formed, preferably, of wood treated with a waterproofing and preserving material. Within this trough the wireways are formed. The wireways are formed of compound tubes possessing high insulating properties, which tubes will be hereinafter more fully described. These tubes are laid and held at certain distances apart, preferably by securing uprights in the bottom board of the trough between the tubes. For these uprights, as a matter of economy, I employ insulating-tubes of small diameter, which are set into holes bored in the bottom board of the trough. The wireway-tubes are supported away from the bottom of the trough and also in tiers by means of cross-tubes of small diameter, the ends of which lie in grooves in the opposite upright sides of the trough. A section of conduit being formed up to this point, as above described, an insulating material in a fluid state is poured into the trough and allowed to harden. By the arrangement of the wireway-tubes in the trough the molten insulating material is permitted to surround the tubes on all sides and to separate each tube from the others and from the walls of the trough, the tubes acting as mandrels in the formation of the conduit. As the insulating-liquid I employ, preferably, ordinary black pitch heated to a liquid state, which increases the insulation of each wireway. A cover is laid on the trough, and the conduit is completed ready to have the wires drawn through the same.

The man-holes which I prefer to use I term "double-jacketed"—that is, provided with inner and outer walls with a sealing medium between them, so that no moisture or gases will penetrate. At the point where the conduit enters the man-hole I provide a double seal by arranging around the trough of the conduit a flange, which extends about midway between the two walls of the man-hole in such manner that the sealing material effects a seal at both sides of the flange, thus forming a double seal at a point where moisture and gases are likely to enter. I also arrange the man-hole with two covers, an outer cover about on a level with the street and an inner cover formed of two disks of spring metal separated by a rigid annulus, the lower disk having arranged below it in the man-hole a seat, to which it is forced by forcing in between the two disks a fluid under pressure. The hand-holes which I prefer to use are also double-jacketed and sealed in the same manner as are the man-holes. These hand-holes are specially useful in obtaining access to the conductors at any intermediate point between the man-holes, especially for the purpose of assisting the introduction of the wires into the wireways.

The junction-box for house connections which I prefer to use is formed as a horizontal offset or projection from the conduit, the ducts for the mains being divided near the junction-box, and each end or division being provided with a bend of compound tubing similar to the tubing used in the conduit. These two bends, where no leads are taken from the mains, are connected by a third bend, the three bends being of such a gradual curvature that but little obstruction will be made to the drawing of the wire through the same continuously. Where, however, a lead is to be taken from the mains, each of these bends is provided with an elbow-bend, also preferably of compound tubing, which joins with another section of conduit leading to the translating devices. By this arrangement when it is desired to connect or sever a lead the same may be done without injuring the main conduit.

The compound tube which I propose to use as the wireway is made by combining a formed base of animal, vegetable, or mineral porous fibrous material with a filling of a bituminous compound in such manner that the base and filling material become a homogeneous tube, which will be dense and hard, possess high insulating properties and be unaffected by ordinary thermal or hygrometric changes. Preferably to produce this compound tube I take animal or vegetable paper of an open porous structure, as felt paper, and form it to the desired shape. This formed base I combine with the filling material, which, preferably, is black petroleum-pitch, by immersing the formed base in the filling material or compound a number of times, the filler being maintained in a liquid state by heat, and allowing a period of rest between each immersion. By this method I obtain a compound tube which is superior to all tubes heretofore used as conduits for electric conductors in economy of first cost, durability, insulating and waterproofing qualities.

In the accompanying drawings, forming a part of this specification, Figure 1 is a diagram showing the arrangement of my underground system. Fig. 2 is a perspective view of a conduit, showing the flange which extends between the two walls of the man-hole or hand-hole to effect the double seal. Fig. 3 is a cross-section of the man-hole employed in my system, showing some of the wireways carried out of the man-hole at right angles to their line of entrance. Fig. 4 is a plan view of the arrangement of conduits referred to as being shown in Fig. 3, being taken with the upper section of the man-hole removed. Fig. 5 is a top plan view of the bottom part of the man-hole having a single conduit passing therethrough, and showing also the method of incasing the conductors between the ends of two sections of conduit. Fig. 6 is a vertical section taken on the plane of the line 7 7 of Fig. 3. Fig. 7 is a vertical section of a hand-hole. Fig. 8 is a plan view of the house junction-box employed for taking off leads for houses with the cover removed. Fig. 9 is a junction-box for connecting a branch with the main.

In the drawings, A is the conduit; B, the man-hole; C, the hand-hole, and D the junction-box for house connections.

The conduit A has an outer casing of wood or other material E, treated with a preserving and waterproofing compound. This casing is laid in sections of any length, the bottom and the two uprights thereof forming a trough, the cover being applied after completion of the conduit.

Near each end of the sections of the trough holes are bored to receive uprights F, one upright being arranged next each upright wall of the trough and other smaller uprights being arranged between each of the tubes G, which form the wireways of the system. Grooves H are formed longitudinally in the side walls of the trough for the reception of cross-tubes I, arranged so as to be interposed between the tubes G in the bottom of the trough and between each tier of tubes. This arrangement of uprights and cross-supports holds the tubes away from the walls of the trough and from one another, so that when the insulating material is poured about them it may have free access and completely surround each tube. The uprights F and cross-supports I are preferably made of compound tubing, which is inexpensive to use and may be quickly cut to the desired lengths. After the wireway-tubes G are properly laid in the trough the insulating material is poured therein and surrounds each tube completely, and when it has become hardened the cover of the trough is secured in place.

A conduit constructed as above described possesses superior insulating qualities, as the wireways themselves are of insulating material and are further inclosed in insulating material. They are also dry, as no moisture can penetrate to the wireways by reason of the thorough protection afforded by the outer casing of treated wood or other material, the inner casing surrounding the wireways and the wireways themselves all being waterproofing materials. Consequently by reason of the high insulation and dry condition of the wireways it is possible to employ naked conductors, due provision being made where the conduit is tapped for leads or provided with man-holes or hand-holes to prevent moisture entering at those points.

The man-hole is formed in sections for facility of combining with the conduits. The lower section J comprises an outer wall K and a bottom K′, formed of wood or other material, preferably treated with a waterproofing compound or coating, and an inner wall L, having a bottom L′, preferably of the same material. The bottom L′ is held above the bottom K′ by legs M, preferably at a distance therefrom about equal to the distance between the walls K and L. This lower section J of the man-hole is laid in the ground and the conduit enters the same through the openings N. Where a conductor is to be led out of a man-hole at right angles to the line of entrance, the conduits are arranged in the man-hole, as shown in Fig. 4, passing through openings N′ at right angles to the openings N. A box *a* (shown in plan, Fig. 4) is arranged within the man-hole, and into this box the conduits are carried, the hardened insulating material ending at $x$, as indicated in the drawings. This leaves the tubes G and bends bared for a portion of their length within the box $a$. This is desirable for facilitating connections and laying of wires; but to protect the tubes G from all danger from moisture a fluid insulating material is poured into the box $a$, so as to surround the bare wireway-tubes and protect the same.

Where a branch is taken from any of the conductors, the duct containing the main has interposed in its length a small oblong box $b$. (Shown in Fig. 9 of the drawings.) This box, it will be seen, is provided at each end and at one side with nipples $c$, projecting outward from the walls thereof. Into these nipples the ducts are led and cemented, so as to form water-tight joints therewith. The main conductor passes through the box and the branch is connected to it, as shown in the drawings. After the branch connection is made insulating material similar to that used to incase the tubes G is poured in and allowed to harden, a cover being placed over the whole, if desired. The conduit where it passes through the openings N and N' is preferably provided about midway between the walls of the man-hole with the flange O extending all the way around the outer casing of the conduit, so as to raise the same from the bottom K' of the man-hole. The upper section of the man-hole may be formed of cast-iron or other suitable material, and comprises an outer wall P and an inner wall Q, held together by bolts or otherwise. Both the walls P and Q are so arranged that they set directly upon the walls K and L of the lower section, and have depending flanges P' and Q' extending down to the conduit, whereby the joint is more effectually protected from the entrance of moisture or gases. The upper portion of the upper section of the man-hole is provided with seat R, which receives the street-cover S. Between the walls P and Q at their upper end a seat is afforded for the inner cover T. This inner cover T is formed of two spring-metal disks T' T$^2$, the edges of which all around are brazed or otherwise secured to an annulus U of cast metal. This annulus U has a number of bolts U', which are provided with an oblong head U$^2$, the bolt-holes in the annulus being oblong, as are also the holes in the seat for the cover T, as shown at U$^3$. The plate T' of the cover is provided with a cock T$^3$, through which fluid under pressure is forced into the space between the plates T' and T$^2$. When the conduits have been properly laid in the lower section of the man-hole and the upper section has been set in place, the sealing material is poured in through the elongated openings U$^3$ in the seat for the cover T. This sealing material, which may be oil or pitch, flowing, as it does, all around the conduit between the walls K and L and the bottoms K' and L' on each side of the flange O, projecting from the conduit, effectually prevents the entrance of gases or moisture at the points of junction of the conduit and man-hole and also through the wall of the man-hole. When a permanent fluid seal is used, care must, of course, be taken to calk all joints, so that there is no escape of liquid. After the insulating material has been introduced the cover T will be dropped in place, the bolts being turned, so that their elongated heads will pass through the elongated slots U$^3$. The bolts are then turned at right angles to their first position. Liquid or fluid under pressure is then forced through the cock T$^3$ between the plates T' and T$^2$ of the cover until the plates of the cover assume the position shown in dotted lines in Fig. 3, a ledge T$^4$ being provided on the inner wall Q of the man-hole, with which the distended plate T$^2$ makes a close contact, a suitable packing T$^5$ being provided. The distention of the plates T' and T$^2$ tightens the bolts U'. The outer cover S is then set in place.

It will be seen from this description that the man-hole is not only sealed at the point of junction of the conduits with it, but also that it is sealed at its mouth, so that no moisture or gases penetrate into the working-space thereof.

In Fig. 5 I have shown the method I prefer for protecting the conductors in the manholes where the conduit has not been carried completely through the man-hole. In that figure, $a'$ is a conductor. $b'$ $b'$ are split sleeves, preferably semicircular, made of paper impregnated with insulating material. These split sleeves are applied over the conductor, as shown in the second wireway to the right in Fig. 5. Over these split sleeves $b'$ two short sections of tube $c'$ are drawn, as shown in the third tube to the right of Fig. 5, and over the joint formed by the tubes $c'$ $c'$ a short tube $d$ is drawn. The tube-sections $c'$ $c'$ effectually close the joints made between the sections $b'$ $b'$, and the joint formed by the abutting sections $c'$ $c'$ is itself closed by the tube $d$. Over the whole is then poured an insulating material, so as to effectually seal all the joints. In Fig. 8 the hand-hole is shown. This hand-hole need not be specifically described, as it is in all its essential features substantially the same as the man-hole, except that it is smaller.

In Fig. 8 is shown the method of laying the conduit at places where it is anticipated that a future connection is likely to be made. As will be seen, the main wireway is divided, and at each end of the division a bend $e$ is secured. These two bends are connected by a third bend $f$, so that the main wire may be drawn through the wireway without greatly increased obstruction. This series of bends is incased in a box $g$, which is provided with a suitable cover, insulating material being poured about the wireways, as is done with the conduit. When it is desired to make a connection, all that is necessary is to remove the cover from the box $g$ and cut away the material from around the bend $f$, so as to remove the same, and apply an elbow-bend $h$ to one end of each of the bends e, the proper connections being made with the electric conductors.

Of course it will be understood that the conductors are conveyed to the house or other place of use in suitable insulated conduits, and are preferably distributed in the house also in insulated tubes.

Having thus described my invention, what I claim is—

1. The combination of tubes forming wireways, a trough for said tubes having grooves in its opposite sides and holes in its bottom, and upright and cross pieces fitting, respectively, in said grooves and holes, whereby said tubes are held separate, substantially as set forth.

2. The combination, in a man-hole, of a double-walled body portion and a filling of a waterproofing cement or liquid, and a hollow cover adapted to close said body portion and be distended to effect a water-proof joint, substantially as set forth.

3. A cover for an underground man-hole, comprising elastic plates, a rigid annulus between said plates, and a cock on one of said plates for the purpose of permitting a liquid under pressure to be forced between them, substantially as set forth.

4. In a cover for an underground man-hole, the combination, with flexible plates, rigid annulus, and cock, of elongated bolt-holes in said annulus, substantially as set forth.

5. The combination, in an underground man-hole, of a cover provided with flexible plates adapted to be distended by having a fluid under pressure forced between them, and a seat for the under plate of said cover provided with a packing, substantially as set forth.

6. The combination, in an underground man-hole, of a section of said man-hole provided with a seat and elongated bolt-holes, a cover provided with flexible plates adapted to be distended by having a liquid forced between them, and provided with bolts having elongated heads, whereby said cover may be brought to make a tight connection with said section of man-hole, substantially as set forth.

7. A man-hole for underground systems of electrical distribution, formed with a lower section into which the conduits enter, and an upper section provided with depending flanges $P'$ $Q'$, extending below the top of the side walls of the lower section, said upper section being adapted to be put in place after the conduits have been laid in the lower section and provided with suitable covers, substantially as set forth.

8. The combination, in an underground system of electrical distribution, of a double-jacketed man-hole, a conduit passing through openings in said man-hole, and a flange surrounding said man-hole between the walls of said conduit, whereby when a waterproofing cement or liquid is poured into the space between the walls of said man-hole a double seal is effected, substantially as set forth.

9. In a house junction-box for an underground conduit system, a laterally-arranged projection or box and a section of gradually-curved wireway-tube entering said box, said tube being provided within said box with a removable section, substantially as set forth.

10. In a man-hole junction-box, the combination, with wireway ducts, of liquid insulating material surrounding said ducts within the junction-box, substantially as set forth.

11. A connector for wireway-tubes in an underground system, comprising a split sleeve for surrounding the conductor between the tube ends, a two-part tube covering the joints of the split sleeve, and an outer tube covering the joint of the two-part tube, substantially as set forth.

This specification signed and witnessed this 19th day of May, 1890.

EDWIN T. GREENFIELD.

Witnesses:
 C. S. CHAMPION,
 WILLIAM PELZER.